(12) United States Patent
Kim et al.

(10) Patent No.: US 11,631,271 B2
(45) Date of Patent: Apr. 18, 2023

(54) FINGERPRINT SENSOR AND DISPLAY DEVICE INCLUDING THE SAME

(71) Applicant: Samsung Display Co., Ltd., Yongin-si (KR)

(72) Inventors: Ji Sun Kim, Yongin-si (KR); Mu Kyung Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/162,050

(22) Filed: Oct. 16, 2018

(65) Prior Publication Data

US 2019/0156093 A1  May 23, 2019

(30) Foreign Application Priority Data

Nov. 17, 2017  (KR) ......................... 10-2017-0154128

(51) Int. Cl.
  *G06V 40/13*  (2022.01)
  *G06F 3/041*  (2006.01)
  *G06F 3/044*  (2006.01)
  *G06V 10/147*  (2022.01)

(52) U.S. Cl.
  CPC .......... *G06V 40/1306* (2022.01); *G06F 3/044* (2013.01); *G06F 3/0416* (2013.01); *G06V 10/147* (2022.01); *G06F 2203/04112* (2013.01)

(58) Field of Classification Search
  None
  See application file for complete search history.

(56) References Cited

U.S. PATENT DOCUMENTS

| | | | |
|---|---|---|---|
| 6,657,269 B2 * | 12/2003 | Migliorato | G01N 27/4148 257/71 |
| 10,032,921 B2 | 7/2018 | Takahashi et al. | |
| 2003/0016024 A1 * | 1/2003 | Teranuma | G06V 40/1306 324/519 |
| 2004/0213440 A1 * | 10/2004 | Joo | G06V 40/1306 382/124 |
| 2006/0076963 A1 * | 4/2006 | Miyasaka | G06K 9/0002 324/662 |

(Continued)

FOREIGN PATENT DOCUMENTS

| | | |
|---|---|---|
| CN | 106156741 A | 11/2016 |
| JP | 2015-228020 A | 12/2015 |
| KR | 10-2017-0015192 A | 2/2017 |

*Primary Examiner* — Benjamin X Casarez
(74) *Attorney, Agent, or Firm* — Lewis Roca Rothgerber Christie LLP

(57) ABSTRACT

A fingerprint sensor includes a sensor pixel arranged in a sensing area, including a pixel electrode coupled to a first node; a first transistor coupled between the first node and a first or second power line, the first transistor including a first gate electrode coupled to a first scan line and a second gate electrode opposite to the first gate electrode; a first capacitor coupled between the first node and a second scan line; a second transistor coupled between a readout line and the first power line, the second transistor including a first gate electrode coupled to the first node and a second gate electrode opposite to the first gate electrode; and a third transistor coupled between the second transistor and the first power line, the third transistor including a first gate electrode coupled to the second scan line and a second gate electrode opposite to the first gate electrode.

20 Claims, 9 Drawing Sheets

(56) References Cited

U.S. PATENT DOCUMENTS

| | | | |
|---|---|---|---|
| 2014/0168157 A1* | 6/2014 | Yang | G09G 3/3648 |
| | | | 345/174 |
| 2014/0210777 A1* | 7/2014 | Saito | G06F 3/044 |
| | | | 345/174 |
| 2014/0367673 A1* | 12/2014 | Takahashi | H01L 29/7869 |
| | | | 257/43 |
| 2015/0236169 A1 | 8/2015 | Park et al. | |
| 2015/0301636 A1* | 10/2015 | Akimoto | G06F 3/044 |
| | | | 345/173 |
| 2015/0316958 A1* | 11/2015 | Takesue | G06F 3/044 |
| | | | 345/173 |
| 2016/0042216 A1* | 2/2016 | Yang | G06K 9/0002 |
| | | | 382/124 |
| 2016/0253541 A1* | 9/2016 | Yang | G09G 3/32 |
| | | | 382/124 |
| 2016/0260380 A1* | 9/2016 | Yang | G09G 3/32 |
| 2016/0282990 A1* | 9/2016 | Kimura | G02F 1/13338 |
| 2017/0160841 A1* | 6/2017 | Lou | G06F 3/0412 |
| 2017/0317085 A1* | 11/2017 | Kurokawa | H01L 27/105 |
| 2018/0018918 A1* | 1/2018 | Miyake | G09G 3/36 |
| 2018/0130857 A1* | 5/2018 | Lee | H01L 27/3234 |
| 2018/0189538 A1* | 7/2018 | He | G06K 9/0002 |
| 2018/0364845 A1* | 12/2018 | Lee | H01L 27/1255 |
| 2019/0138131 A1* | 5/2019 | Kim | G06F 3/0416 |
| 2019/0171860 A1* | 6/2019 | Wu | G06K 9/0002 |
| 2019/0324580 A1* | 10/2019 | Tanaka | H01L 51/0097 |
| 2020/0356743 A1* | 11/2020 | Li | G06K 9/0002 |

\* cited by examiner

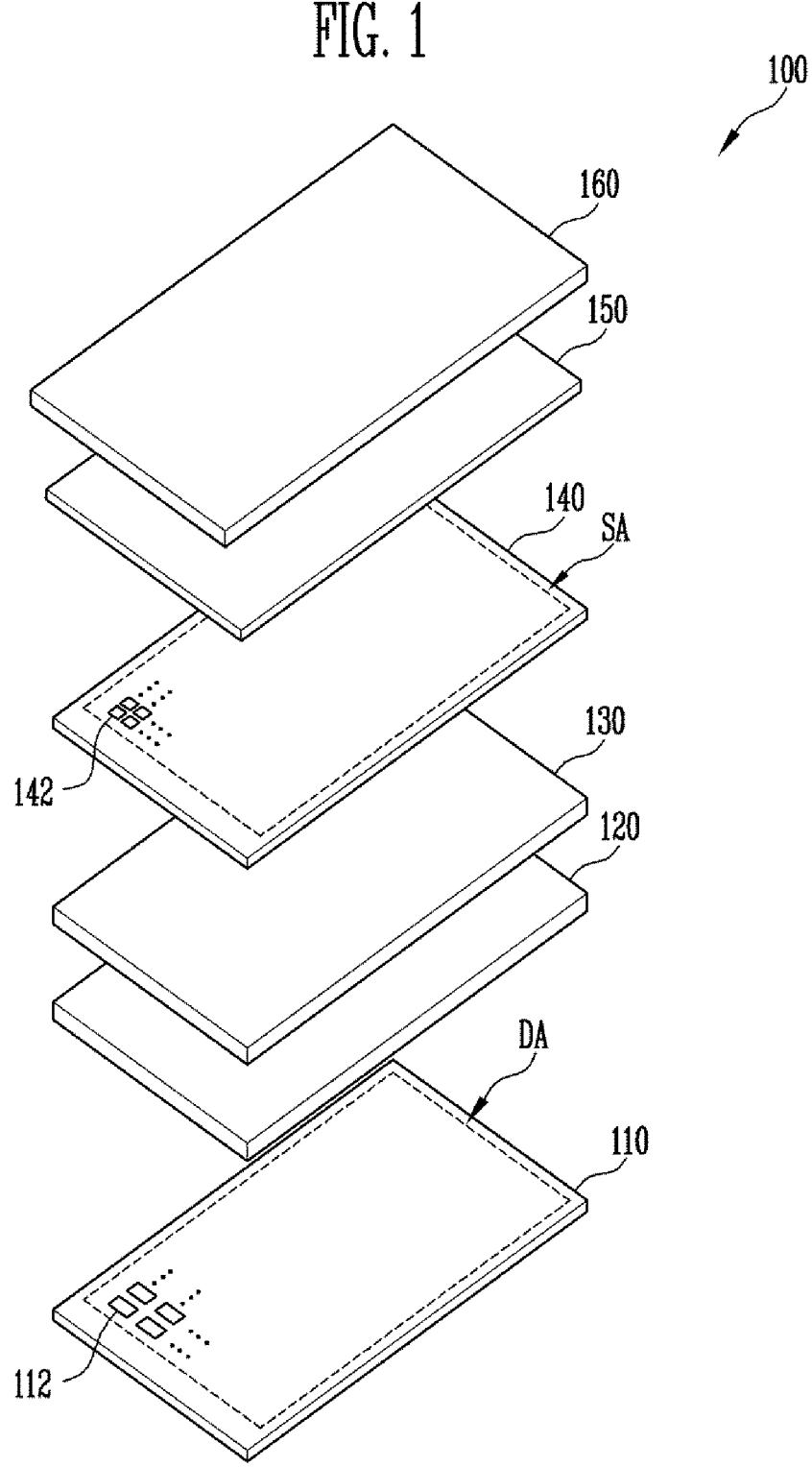

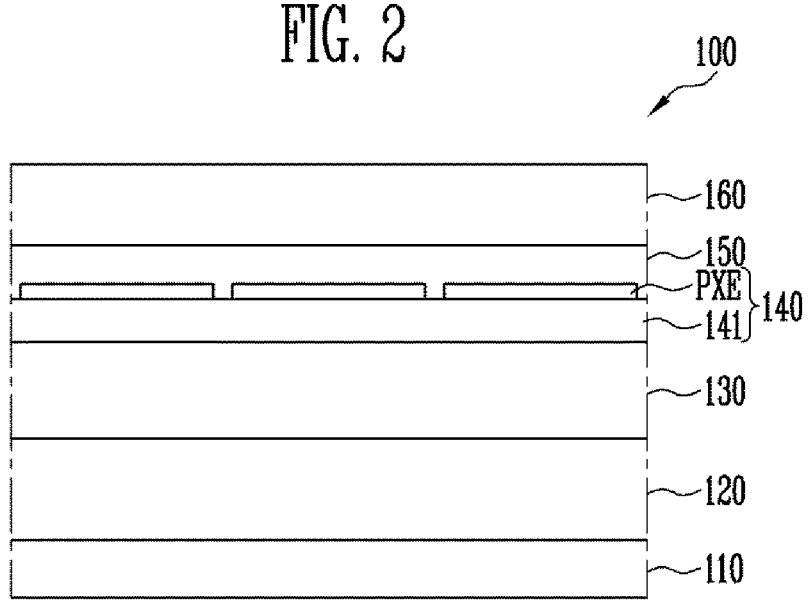
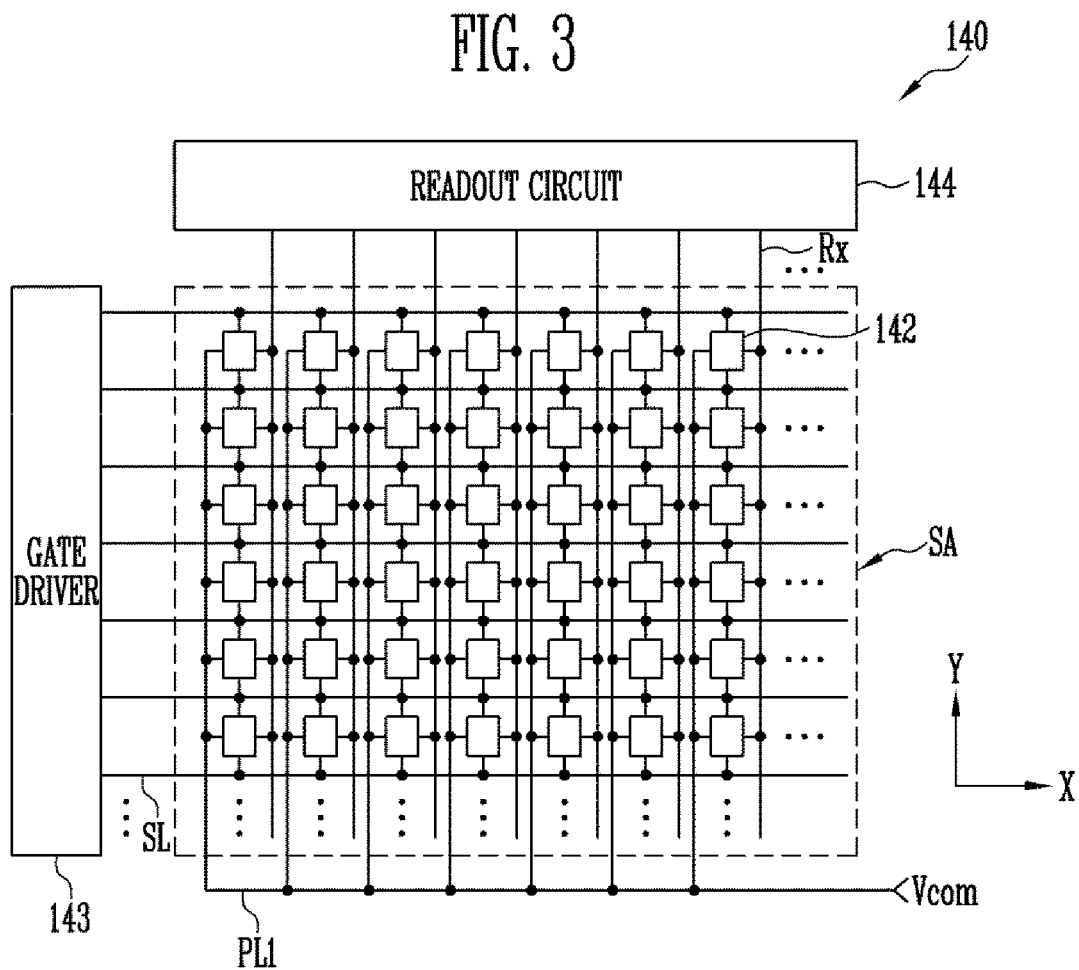

FINGERPRINT SENSOR AND DISPLAY DEVICE INCLUDING THE SAME

CROSS-REFERENCE TO RELATED APPLICATION

The application claims priority to and the benefit of Korean patent application 10-2017-0154128 filed on Nov. 17, 2017 in the Korean Intellectual Property Office, the entire disclosure of which is incorporated herein by reference.

BACKGROUND

1. Field

An aspect of the present disclosure relates to a fingerprint sensor and a display device including the same.

2. Related Art

Recently, as display devices such as smartphones and tablet PCs are used in various applications such as electronic financial transactions, authentication methods using biometric information of users have been widely used. One method among various biometric information authentication methods is an authentication method using fingerprints. Accordingly, demand for fingerprint sensors and display devices including the same are rapidly increasing.

SUMMARY

Embodiments provide a high-sensitivity fingerprint sensor and a display device including the same.

According to an aspect of the present disclosure, there is provided a fingerprint sensor including: at least one sensor pixel arranged in a sensing area, wherein the sensor pixel includes: a pixel electrode coupled to a first node; a first transistor coupled between the first node and a first or second power line, the first transistor including a first gate electrode coupled to a first scan line and a second gate electrode opposite to the first gate electrode, the second gate electrode being coupled to the first or second power line; a first capacitor coupled between the first node and a second scan line; a second transistor coupled between a readout line and the first power line, the second transistor including a first gate electrode coupled to the first node and a second gate electrode opposite to the first gate electrode; and a third transistor coupled between the second transistor and the first power line, the third transistor including a first gate electrode coupled to the second scan line and a second gate electrode opposite to the first gate electrode.

The second gate electrode of the second transistor may be coupled to the first gate electrode of the second transistor.

The second gate electrode of the second transistor may be coupled to a control line.

The second gate electrode of the third transistor may be coupled to the first power line.

The first gate electrodes of the first, second, and third transistors may be disposed on the top of active layers of the first, second, and third transistors, respectively, to be spaced apart from the active layers, and the second gate electrodes of the first, second, and third transistors may be disposed between a sensor substrate and the active layers of the first, second, and third transistors, respectively, to be spaced apart from the active layers.

Each of the second gate electrodes of the first, second, and third transistors may be configured with a light shielding conductive layer.

The second gate electrodes of the first and third transistors may be coupled to source electrodes of the first and third transistors, respectively, and the second gate electrode of the second transistor may be coupled to the first gate electrode of the second transistor.

The fingerprint sensor may further include a fourth transistor coupled between the readout line and the second transistor, the fourth transistor including a first gate electrode coupled to the second scan line and a second gate electrode opposite to the first gate electrode.

The second gate electrode of the fourth transistor may be coupled to a source electrode of the fourth transistor.

The first and second scan lines may extend along a first direction while being spaced apart from each other in the sensing area, the first or second power line and the readout line may extend along a second direction while being spaced apart from each other in the sensing area, and the pixel electrode may be disposed in a unit area surrounded by the first and second scan lines, the first or second power line, and the readout line.

The fingerprint sensor may include: a plurality of scan lines including the first and second scan lines; a plurality of readout lines including the readout line; at least one power line including the first or second power line; and a plurality of sensor pixels including the at least one sensor pixel, the plurality of sensor pixels being coupled to the scan lines, the readout lines and the at least one power line.

According to an aspect of the present disclosure, there is provided a display device including: a display panel including display pixels arranged in a display area; and a fingerprint sensor including scan lines, readout lines, at least one power line, and sensor pixels, which are arranged in a sensing area, wherein at least one of the sensor pixels includes: a pixel electrode coupled to a first node; a first transistor coupled between the first node and a first or second power line, the first transistor including a first gate electrode coupled to a first scan line and a second gate electrode opposite to the first gate electrode, the second gate electrode being coupled to the first or second power line; a first capacitor coupled between the first node and a second scan line; a second transistor coupled between the first power line and any one readout line among the readout lines, the second transistor including a first gate electrode coupled to the first node and a second gate electrode opposite to the first gate electrode; and a third transistor coupled between the second transistor and the first power line, the third transistor including a first gate electrode coupled to the second scan line and a second gate electrode opposite to the first gate electrode.

The second gate electrode of the second transistor may be coupled to the first gate electrode of the second transistor.

The second gate electrode of the second transistor may be coupled to a control line.

The second gate electrode of the third transistor may be coupled to the first power line.

Each of the first, second, and third transistors may include: an active layer disposed on a sensor substrate, the active layer including a channel region; the first gate electrode disposed on the active layer to overlap with the channel region; the second gate electrode disposed between the sensor substrate and the active layer to overlap with the channel region; and a source electrode and a drain electrode, respectively coupled to different ends of the active layer.

Each of the second gate electrodes of the first, second, and third transistors may be configured with a light shielding conductive layer.

The second gate electrodes of the first and third transistors may be coupled to source electrodes of the first and third transistors, respectively.

At least one of the sensor pixels may further include a fourth transistor coupled between the one readout line and the second transistor. The fourth transistor may include: a first gate electrode coupled to the second scan line; a drain electrode coupled to the readout line; and a source electrode and a second gate electrode, coupled to the second transistor.

The sensing area may be disposed to overlap with the display area.

According to the present disclosure, it is possible to provide a fingerprint sensor having high sensitivity and reliability and a display device including the fingerprint sensor.

BRIEF DESCRIPTION OF THE DRAWINGS

Example embodiments will be described more fully hereinafter with reference to the accompanying drawings; however, embodiments according to the present disclosure may be embodied in different forms and should not be construed as limited to the example embodiments set forth herein. Rather, these embodiments are provided so that this disclosure will be thorough and complete, and will fully convey the scope of the example embodiments to those skilled in the art.

In the figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 1 illustrates a display device according to an embodiment of the present disclosure.

FIG. 2 schematically illustrates a section of the display device according to an embodiment of the present disclosure.

FIG. 3 illustrates a fingerprint sensor according to an embodiment of the present disclosure.

DETAILED DESCRIPTION

Figure 4:
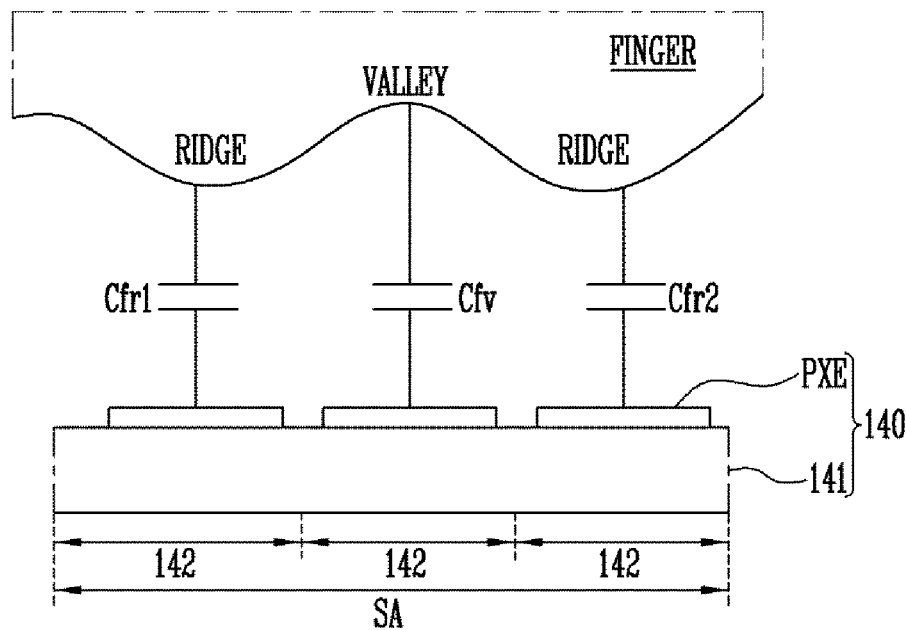
FIG. 4 illustrates a fingerprint sensor and a sensed finger according to an embodiment of the present disclosure.

Hereinafter, exemplary embodiments of the present disclosure will be described in detail with reference to the accompanying drawings. However, the present disclosure is not limited to the embodiments but may be implemented into different forms. These embodiments are provided only for illustrative purposes and for full understanding of the scope of the present disclosure by those skilled in the art. In the entire specification, when an element is referred to as being "connected" or "coupled" to another element, it can be directly connected or coupled to the another element or be indirectly connected or coupled to the another element with one or more intervening elements interposed therebetween.

Meanwhile, in the following description and the attached drawings, elements not directly related to the present disclosure may be omitted, and dimensional relationships among individual elements in the attached drawings are illustrated only for ease of understanding but not to limit the actual scale. It should be noted that in giving reference numerals to elements of each drawing, like reference numerals refer to like elements even though like elements are shown in different drawings.

FIG. 1 illustrates a display device according to an embodiment of the present disclosure. FIG. 2 schematically illustrates a section of the display device according to an embodiment of the present disclosure.

Referring to FIGS. 1 and 2, the display device 100 according to an embodiment of the present disclosure includes a display panel 110 and a fingerprint sensor 140 disposed on a surface of the display panel 110. For convenience, a case where the fingerprint sensor 140 is a separate sensor panel separated from the display panel 110 is illustrated in FIG. 1, but the present disclosure is not limited thereto. For example, in another embodiment of the present disclosure, the fingerprint sensor 140 may be integrally configured (e.g., integral) with the display panel 110. In addition, an embodiment in which the fingerprint sensor 140 is disposed on the top of the display panel 110, e.g., between the display panel 110 and a window 160 is illustrated in FIG. 1, but the position of the fingerprint sensor 140 may be changed.

Also, the display device 100 may further include a polarizing layer 120 and the window 160, which are disposed at an image display surface (e.g., a front surface) of the display panel 110. For example, the polarizing layer 120 may be disposed between the display panel 110 and the fingerprint sensor 140, and the window 160 may be disposed at the uppermost end (e.g., the frontmost end) of the display device 100. However, in some embodiments, at least one of the polarizing layer 120 and the window 160 may be omitted. Alternatively, at least one of the polarizing layer 120 and the window 160 may be integrally configured (e.g., integral) with the display panel 110 and/or the fingerprint sensor 140.

Also, the display device 100 may further include a first adhesive layer 130 disposed between the display panel 110 and the fingerprint sensor 140, and a second adhesive layer 150 disposed between the fingerprint sensor 140 and the window 160. Each of the first and second adhesive layers 130 and 150 may be substantially transparent to enable light from the display panel 110 to be transmitted therethrough, and the material, stacking structure, and/or thickness of each of the first and second adhesive layers 130 and 150 is not particularly limited. In some embodiments, at least one of the first and second adhesive layers 130 and 150 may be omitted. For example, when the fingerprint sensor 140 is integrally implemented with the polarizing layer 120 and/or the window 160, at least one of the first and second adhesive layers 130 and 150 may be omitted.

The display panel 110 includes a plurality of display pixels 112 arranged in a display area DA. The display panel 110 is coupled to a display driver (not shown), to be driven by the display driver. In the present disclosure, the structure or driving method of the display panel 110 is not particularly limited. That is, the display panel 110 may be implemented with display panels having various structures and/or driving methods currently known in the art.

The fingerprint sensor 140 includes at least one sensor pixel 142 arranged in a sensing area SA. For example, the fingerprint sensor 140 may include a plurality of sensor pixels 142 arranged in a regular array form in the sensing area SA.

In some embodiments, the sensing area SA may be disposed to overlap with the display area DA. For example, the whole of the display area DA may be set as the sensing area SA, or only a partial area in the display area DA may be set as the sensing area SA.

The sensor pixels 142 arranged in the sensing area SA constitute a sensing unit of the fingerprint sensor 140. That is, sensing signals corresponding to different portions (e.g., each portion) of a fingerprint are generated using the sensor pixels 142, and the shape, etc. of the fingerprint is detected by synthetically analyzing the sensing signals.

Various embodiments of the shape, size, number, resolution, and/or arrangement structure of the sensor pixels 142 arranged in the sensing area SA are contemplated in the present disclosure. The sensor pixels 142 may be distributed in the sensing area SA with a fine size and a high resolution which capable of detecting a fingerprint. Also, the sensor pixels 142 may be regularly arranged in the sensing area SA, but the present disclosure is not limited thereto. For example, in another embodiment, the sensor pixels 142 may be irregularly arranged in the sensing area SA. Alternatively, the sensing area SA may be divided into a plurality of areas, and the sensor pixels 142 may be distributed with different densities with respect to the different areas.

In some embodiments of the present disclosure, it is assumed that the sensor pixels 142 are used to detect a fingerprint, but the present disclosure is not limited thereto. For example, the fingerprint sensor 140 may be used as a touch sensor. That is, the fingerprint sensor 140 according to embodiments of the present disclosure may be a sensor for detecting a fingerprint and/or a touch input.

The display device 100 detects a fingerprint and/or a touch input of a user using the fingerprint sensor 140 including the sensor pixels 142. In some embodiments, the fingerprint sensor 140 may detect a fingerprint and/or a touch input of a user using a self-capacitance method.

To this end, the fingerprint sensor 140, as shown in FIG. 2, may include a sensor substrate 141 and a plurality of pixel electrodes PXE disposed on the sensor substrate 141 to be spaced apart from each other. The pixel electrodes PXE are formed in the sensor pixels 142, respectively. The pixel electrodes PXE may form capacitances by being in contact with (e.g., in proximity to) a contact means such as a finger of a user. The capacitances formed between the pixel electrodes PXE and the finger (particularly, a fingerprint area) may depend on the shape of a fingerprint (e.g., a ridge or valley) in the corresponding area. Therefore, the fingerprint may be detected by detecting a difference between the capacitances formed between the pixel electrode PXE and the finger, using the sensor pixels 142. In addition, since the fingerprint sensor 140 generates a sensing signal by being in contact with (e.g., in proximity to) a finger, etc., the fingerprint sensor 140 may also be used to detect a touch input.

FIG. 3 illustrates a fingerprint sensor according to an embodiment of the present disclosure.

Referring to FIG. 3, the fingerprint sensor 140 according to an embodiment of the present disclosure includes a plurality of scan lines SL, a plurality of readout lines Rx, and at least one first power line PL1, which are arranged in the sensing area SA, and a plurality of sensor pixels 142 coupled to the scan lines SL, the readout lines Rx, and the first power line PL1. Also, the fingerprint sensor 140 further include a gate driver 143 coupled to the scan lines SL and a readout circuit 144 coupled to the readout lines Rx. In some embodiments, the gate driver 143 and/or the readout circuit 144 may be formed or mounted together with the sensor pixels 142 on the sensor substrate 141, or be mounted on a separated circuit board to be electrically coupled to the sensor pixels 142.

The scan lines SL and the readout lines (e.g., detection lines) Rx may extend along different directions to cross each other in the sensing area SA. For example, the scan lines SL may be respectively arranged on rows to extend along a first direction, e.g., an X direction (e.g., may extend in a first direction), and the readout lines Rx may be respectively arranged on columns to extend along a second direction, e.g., a Y direction (e.g., may extend in a second direction), which crosses the first direction (e.g., is perpendicular to the first direction). The scan lines SL are electrically coupled between the gate driver 143 and the sensor pixels 142, to transfer scan signals output from the gate driver 143 to the sensor pixels 142. The readout lines Rx are electrically coupled between the sensor pixels 142 and the readout circuit 144, to transfer sensing signals output from the sensor pixels 142 to the readout circuit 144.

The first power line PL1 couples the sensor pixels 142 to a driving power source. For example, the first power line PL1 may be coupled between the sensor pixels 142 and a common voltage source to supply a set (e.g., predetermined) common voltage Vcom to the sensor pixels 142. The first power line PL1 may branch off into a plurality of sub-power lines in the sensing area SA.

The gate driver 143 drives the scan lines SL during a set (e.g., predetermined) sensing period. For example, the gate driver 143 may sequentially supply scan signals to the scan lines SL during a fingerprint sensing period. Also, in some embodiments, the gate driver 143 may drive the scan lines LS during a touch sensing period. For example, the gate driver 143 may sequentially supply scan signals to the scan lines SL during the touch sensing period.

The readout circuit 144 receives sensing signals from the readout lines Rx during the sensing period, and detects information (e.g., predetermined information) corresponding to the sensing signals. For example, the readout circuit 144 may receive sensing signals from the readout lines Rx during the fingerprint sensing period, and detect a fingerprint of a user by synthesizing (e.g., combining) the sensing signals. Also, in some embodiments, the readout circuit 144 may be used to detect a touch input. For example, the readout circuit 144 may receive sensing signals from the readout lines Rx during the touch sensing period, and detect a touch input using the sensing signals.

FIG. 4 illustrates a fingerprint sensor and a sensed finger according to an embodiment of the present disclosure. For convenience, only a fingerprint area of the finger and a portion of the fingerprint sensor thereunder are schematically illustrated in FIG. 4. However, other components such as the window may be further disposed between the finger and the fingerprint sensor according to the structure of the display device.

Referring to FIG. 4, the fingerprint sensor 140 includes a sensor substrate 141 and a plurality of pixel electrodes PXE provided on the sensor substrate 141. Each of the sensor pixels PXE may be disposed in the area of a corresponding sensor pixel 142.

In some embodiments, the sensor substrate 141 may be substantially transparent. For example, when the fingerprint sensor 140 is disposed on the top (image display surface) of the display panel 110, the sensor substrate 141 may be formed of a transparent or translucent material that satisfies a set (e.g., predetermined) transparency condition. In some embodiments, the sensor substrate 141 may be a thin film substrate made of a glass or plastic material, and various embodiments of materials and/or thicknesses of the sensor substrate 141 are contemplated in the present disclosure. For example, the sensor substrate 141 may be implemented with substrates made of various materials, including a transparent thin film substrate made of a plastic material such as PET, a transparent or colored PI substrate, a glass substrate, and the like.

Also, the sensor substrate 141 may be provided separately from the display panel 110, or be implemented with at least one substrate and/or insulating layer constituting the display panel 110. For example, the sensor substrate 141 may be a separate sensor substrate separated from the display panel 110, or be integrally configured (e.g., integral) with an upper substrate or thin film encapsulation layer of the display panel 110.

In some embodiments, the pixel electrodes PXE may be substantially transparent. For example, the pixel electrodes PXE may be formed of a transparent or translucent material that satisfies a set (e.g., predetermined) transparency condition, or be formed in a structure that satisfies the transparency condition.

The pixel electrodes PXE may include at least one of a metallic material, a transparent conductive material, and various other conductive materials to have conductivity. Also, when the pixel electrodes PXE include an opaque material, the thickness of the pixel electrodes PXE may be limited, and/or the pixel electrodes PXE may be configured in a mesh form, thereby improving or ensuring transparency. In addition, each of the pixel electrodes PXE may be provided in a single layer or a multi-layer. For example, each of the pixel electrodes PXE may be provided in a double layer including a plate-shaped electrode made of a transparent conductive material and a mesh-shaped metal electrode overlapping with the plate-shaped electrode. That is, in the present disclosure, the material, thickness, and structure of the pixel electrodes PXE are not limited to one particular embodiment.

A metallic material constituting the pixel electrodes PXE may include at least one of various metallic materials such as gold (Au), silver (Ag), aluminum (Al), molybdenum (Mo), chromium (Cr), titanium (Ti), nickel (Ni), neodymium (Nd), copper (Cu), and platinum (Pt), or alloys thereof, but the present disclosure is not limited thereto. Also, a transparent conductive material constituting the pixel electrodes PXE may include silver nanowire (AgNW), indium tin oxide (ITO), indium zinc oxide (IZO), antimony zinc oxide (AZO), indium tin zinc oxide (ITZO), zinc oxide (ZnO), tin oxide ($SnO_2$), carbon nano tube, graphene, and the like, but the present disclosure is not limited thereto. In addition, the pixel electrodes PXE may include various conductive materials (e.g., multiple conductive materials).

If a finger (particularly, a fingerprint area) of a user is in contact with (e.g., in proximity to) the fingerprint sensor on the sensing area SA of the fingerprint sensor 140, capacitances Cfr1, Cfv, and Cfr2 may be respectively formed between pixel electrodes PXE of the corresponding area and the finger due to the contact (e.g., proximity) between the fingerprint sensor 140 and the finger. At this time, the capacitances Cfr1, Cfv, and Cfr2 between the pixel electrodes PXE of the corresponding area and the finger may have different magnitudes according to the shape of the finger (e.g., the fingerprint) of the user.

Specifically, the distance between pixel electrodes PXE and the finger is relatively short in areas in which ridges of the fingerprint are in contact (e.g., in proximity) with the fingerprint sensor 140, and the distance between pixel electrodes PXE and the finger is relatively long in areas in which valleys of the fingerprint are in contact (e.g., in proximity) with the fingerprint sensor 140. Hence, capacitances Cfr1, Cfv, and Cfr2 having different magnitudes are respectively formed between the pixel electrodes PXE and the finger in the areas of sensor pixels 142 corresponding to the ridges and valleys of the fingerprint. For example, as shown in FIG. 4, the magnitudes of the capacitances Cfr1 and Cfr2 respectively formed between the pixel electrodes PXE and the finger in areas corresponding to the ridges of the fingerprint may be larger than that of the capacitances Cfv respectively formed between the pixel electrodes PXE and the finger in areas corresponding to the valleys of the fingerprint. Thus, the fingerprint can be detected by detecting differences between the capacitances Cfr1, Cfv, and Cfr2.

In order to detect the differences between the capacitances Cfr1, Cfv, and Cfr2, a fingerprint sensor of a current sensing method may be implemented using the I-V characteristic of a driving transistor that is coupled to each pixel electrode PXE to apply a current corresponding to the magnitude of a voltage applied to the pixel electrode PXE. For example, the differences between the capacitances Cfr1, Cfv, and Cfr2 respectively formed in the sensor pixels 142 may be detected by detecting a driving current flowing through the driving transistor and calculating a voltage value corresponding to the driving current.

However, in the fingerprint sensor 140 of the current sensing method using self-capacitance as described above, the reliability of the fingerprint sensor 140 may be deteriorated when external light is introduced into the sensor pixels 142. For example, as light emitted from the display pixels 112 disposed on the bottom of the fingerprint sensor 140 is introduced into the sensor pixels 142, a change in characteristic of the driving transistor or leakage current may be caused. Therefore, the reliability of the fingerprint sensor 140 may be deteriorated.

Also, in the above-described fingerprint sensor 140, the sensitivity of the fingerprint sensor 140 may be deteriorated due to parasitic capacitances between the pixel electrodes PXE and circuit elements (e.g., switching transistors and/or driving transistors) or lines adjacent thereto. Accordingly, in the present disclosure, a structure capable of improving the reliability and sensitivity of the fingerprint sensor will be proposed.

Figure 5:
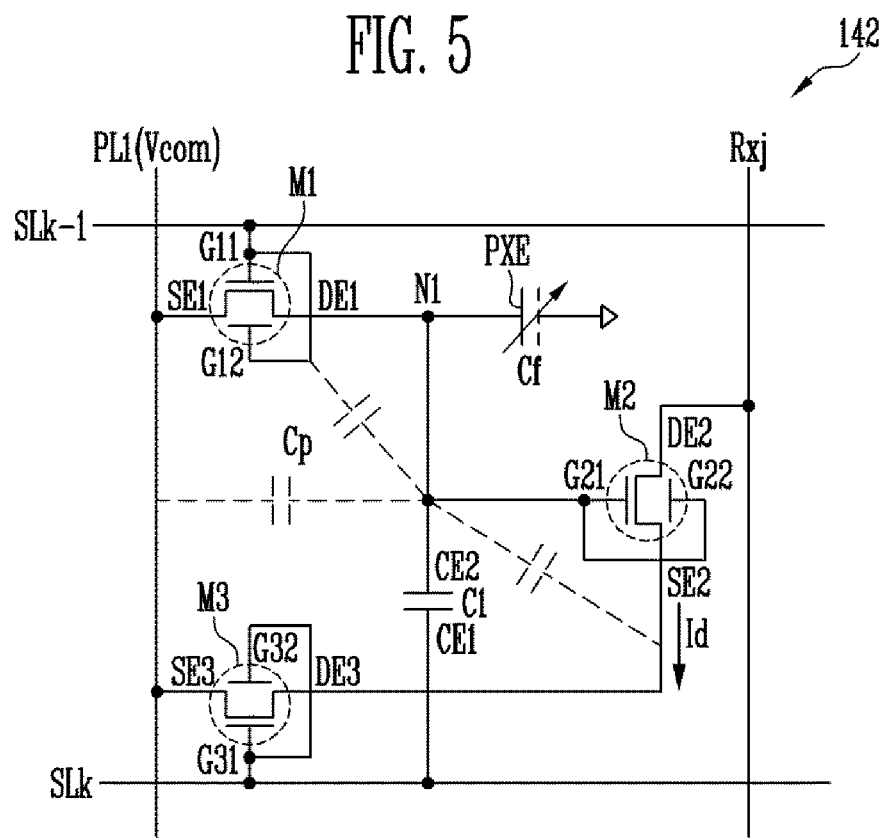
FIG. 5 illustrates a sensor pixel according to an embodiment of the present disclosure.

FIG. 5 illustrates a sensor pixel according to an embodiment of the present disclosure. In some embodiments, the structure of the sensor pixel shown in FIG. 5 may be applied to at least one of the plurality of sensor pixels constituting the fingerprint sensor. For example, the sensor pixels may have the substantially same structure.

Referring to FIG. 5, the sensor pixel 142 according to an embodiment of the present disclosure includes a pixel electrode PXE, first to third transistors M1, M2, and M3, and a first capacitor C1.

The pixel electrode PXE is coupled to a first node N1, and is coupled to the first and second transistors M1 and M2 and the first capacitor C1. When the pixel electrode PXE is in contact with (e.g., in proximity to) a contact means such as a finger, a contact capacitance Cf may form between the pixel electrode PXE and the contact means. The magnitude of the contact capacitance Cf may depend on a distance from the contact means, etc.

The first transistor M1 is coupled between the first node N1 and a first power line PL1. For example, the first transistor M1 may include a drain electrode DE1 coupled to the first node N1 and a source electrode SE1 coupled to the first power line PL1. The positions of the drain electrode DE1 and the source electrode SE1 of the first transistor M1 may be reversed depending on a voltage applied to both ends of the first transistor M1 and/or a type of the first transistor M1. Hereinafter, for convenience, it is assumed that each of the first to third transistors M1, M2, and M3 is an N-type transistor.

In some embodiments, the first transistor M1 may be provided in a double gate structure. For example, the first transistor M1 may include first and second gate electrodes G11 and G12 opposite to each other. Specifically, the first and second gate electrodes G11 and G12 may be opposite to each other with an active layer interposed therebetween. The active layer forms a channel between the drain electrode DE1 and the source electrode SE1 when a driving voltage equal to or higher than a threshold voltage is applied to the first transistor M1. Here, the first and second gate electrodes G11 and G12 may be disposed opposite to each other at the top and bottom of the active layer to overlap with a channel region of the active layer.

In some embodiments, the first and second gate electrodes G11 and G12 of the first transistor M1 may be coupled to a first scan line SLk−1. The first scan line SLk−1 may be any one of the scan lines arranged in the sensing area SA. For example, when it is assumed that the sensor pixel 142 is disposed on a kth (k is a natural number) row of the sensing area SA, the first scan line SLk−1 may be a (k−1)th scan line coupled to sensor pixels 142 of a (k−1)th row so as to detect sensing signals from the sensor pixels 142 of the (k−1)th row.

The second transistor M2 is coupled between any one of the readout lines Rx arranged in the sensing area SA and the first power line PL1. For example, when it is assumed that the sensor pixel 142 is disposed on a jth (j is a natural number) column of the sensing area SA, the second transistor M2 may be coupled between a jth readout line Rxj coupled to sensor pixels 142 of the jth column and the first power line PL1. For example, the second transistor M2 may include a drain electrode DE2 coupled to the jth readout line Rxj and a source electrode SE2 coupled to the first power line PL1 via the third transistor M3.

In some embodiments, the second transistor M2 may be provided in a double gate structure. For example, the second transistor M2 may include first and second gate electrodes G21 and G22 opposite to each other with an active layer interposed therebetween. Here, the first and second gate electrodes G21 and G22 of the second transistor M2 may be disposed opposite to each other at the top and bottom of the active layer to overlap with a channel region of the active layer included in the second transistor M2.

In some embodiments, the first and second gate electrodes G21 and G22 of the second transistor M2 may be commonly coupled to the first node N1. The second transistor M2 controls a driving current Id flowing in the corresponding readout line Rxj, corresponding to a voltage of the first node N1 during a period in which the corresponding sensor pixel 142 is selected in a sensing period for detecting a fingerprint and/or a touch input.

The third transistor M3 is coupled between the second transistor M2 and the first power line PL1. For example, the third transistor M3 may include a drain electrode DE3 coupled to the source electrode SE2 of the second transistor M2 and a source electrode SE3 coupled to the first power line PL1.

In some embodiments, the third transistor M3 may be provided in a double gate structure. For example, the third transistor M3 may include first and second gate electrodes G31 and G32 opposite to each other with an active layer interposed therebetween. Here, the first and second gate electrodes G31 and G32 of the third transistor M3 may be disposed opposite to each other at the top and bottom of the active layer to overlap with a channel region of the active layer included in the third transistor M3.

In some embodiments, the first and second gate electrodes G31 and G32 of the third transistor M3 may be coupled to a second scan line SLk. The second scan line SLk may be any one of the scan lines arranged in the sensing area SA. For example, when it is assumed that the sensor pixel 142 is disposed on the kth row of the sensing area SA, the second scan line SLk may be a kth scan line coupled to sensor pixels 142 of the kth row so as to detect sensing signals from the sensor pixels 142 of the kth row.

The first capacitor C1 is coupled between the first node N1 and the second scan line SLk. The first capacitor C1 changes the voltage of the first node N1 through a coupling action when the voltage of the second scan line SLk is changed.

An operation of the sensor pixel 142 will be described. First, if a scan signal of a gate-on voltage is supplied to the first scan line SLk−1, the first transistor M1 is turned on. Accordingly, the first node N1 is electrically coupled to the first power line PL1, so that the common voltage Vcom is transferred to the first node N1. Thus, the voltage of the first node N1 is initialized (or reset).

After this, if the voltage of the first scan line SLk−1 is changed to a gate-off voltage, the first transistor M1 is turned off. Accordingly, the first node N1 is floated.

After this, if the scan signal of the gate-on voltage is supplied to the second scan line SLk, the voltage of the first node N1 is changed by a degree corresponding to a change amount of the voltage of the second scan line SLk through a coupling action (e.g., a kickback action) of the first capacitor C1. At this time, if it is assumed that a finger of a user is in contact with (e.g., in proximity to) the top of the sensor pixel 142, the voltage of the first node N1 is changed by a degree corresponding to the ratio of the contact capacitance Cf to the capacitance of the first capacitor C1. Thus, the voltage of the first node N1 is changed to have different values according to the magnitudes of contact capacitances Cf formed between the sensor pixels 142 and finger.

In addition, if the scan signal of the gate-on voltage is supplied to the second scan line SLk, the third transistor M3 is turned on. Accordingly, the driving current Id having a magnitude corresponding to the voltage of the first node N1 flows in the sensor pixel 142 due to the second transistor M2 as a current path of the driving current Id is formed. At this time, the readout circuit 144 detects driving currents Id flowing in the respective readout lines Rx. Accordingly, the readout circuit 144 can detect the magnitudes (or magnitude differences) of contact capacitances Cf formed in the respective sensor pixels 142. The readout circuit 144 detects information on a fingerprint (e.g., the shape of the fingerprint) of a user by comparing the magnitudes of the contact capacitances Cf formed in the respective sensor pixels 142.

Meanwhile, a parasitic capacitance Cp may be formed between adjacent circuit elements and/or adjacent lines in each sensor pixel 142. For example, a parasitic capacitance Cp may be structurally formed between the first node N1 and the first and second gate electrodes G11 and G12 of the first transistor M1, the first power line PL1, the source electrode SE2 of the second transistor, or the like. Therefore, when the voltage of the first node N1 is changed through the coupling action of the first capacitor C1, the parasitic capacitance Cp has influence on the voltage of the first node N1, in addition to the first capacitor C1 and the contact capacitance Cf. For example, as the parasitic capacitance Cp is increased, the change amount of the voltage of the first node N1 is decreased. If the change amount of the voltage of the first node N1 is decreased through the coupling action of the first capacitor C1 due to the parasitic capacitance Cp, the sensitivity of the fingerprint sensor 140 may be deteriorated. Accordingly, in another embodiment of the present disclosure, a sensor pixel capable of decreasing the magnitude of the parasitic capacitance Cp that has influence on the voltage of the first node N1 will be proposed.

Figure 6:
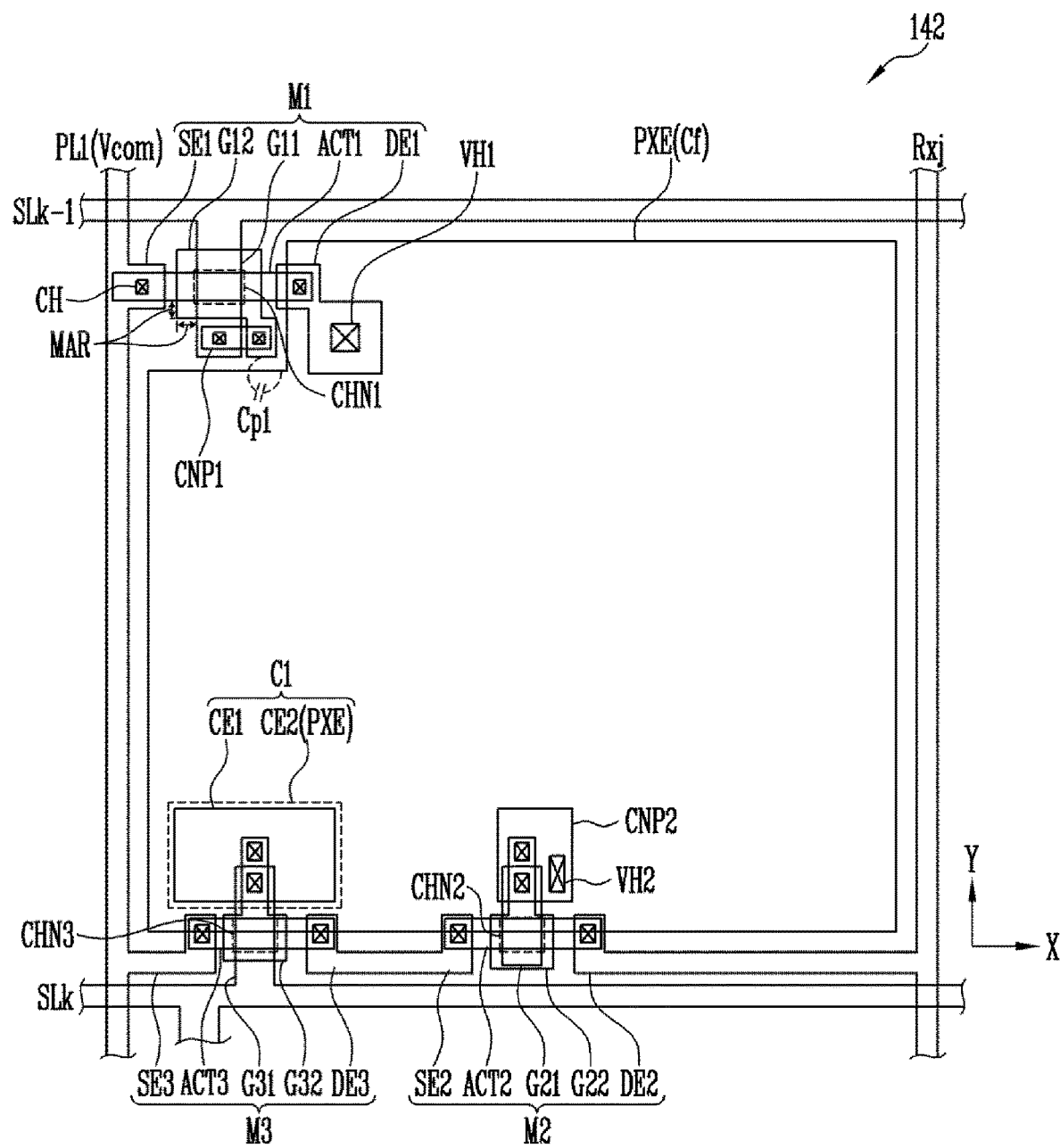
FIG. 6 illustrates a layout embodiment of the sensor pixel shown in FIG. 5.

FIG. 6 illustrates a layout embodiment of the sensor pixel shown in FIG. 5.

Referring to FIG. 6, the first and second scan lines SLk−1 and SLk extend along the first direction in the sensing area SA. For example, the first and second scan lines SLk−1 and SLk may extend in parallel along the X direction while being spaced apart from each other at a set (e.g., predetermined) distance.

The first power line PL1 and the readout line Rxj extend along the second direction to cross the first and second scan lines SLk−1 and SLk in the sensing area SA. For example, the first power line PL1 and the readout line Rxj may extend in parallel along the Y direction while being spaced apart from each other at a set (e.g., predetermined) distance.

A sensor pixel 142 may be disposed in an area defined by the first and second scan lines SLk−1 and SLk, the first power line PL1, and the readout line Rxj. For example, the pixel electrode PXE may be disposed in a unit area surrounded by the first and second scan lines SLk−1 and SLk, the first power line PL1, and the readout line Rxj. In some embodiments, each sensor pixel 142 may be disposed in a corresponding area.

The first transistor M1 includes at least a first gate electrode G11, an active layer ACT1, a source electrode SE1, and a drain electrode DE1. Also, the first transistor M1 further includes a second gate electrode G12 overlapping with the first gate electrode G11 and a region of the active layer ACT1.

The first gate electrode G11 of the first transistor M1 may protrude from a region of the first scan line SLk−1 to be integrally configured (e.g., integral) with the first scan line SLk−1 (e.g., the first gate electrode G11 may be an integral portion of the first scan line SLK−1). The active layer ACT1 of the first transistor M1 is disposed such that a region of the active layer ACT1 overlaps with the first gate electrode G11. The active layer ACT1 is disposed to be spaced apart from the first gate electrode G11 with at least one insulating layer interposed therebetween. The active layer ACT1 includes a channel region CHN1 formed in the region overlapping with the first gate electrode G11, and the ends of the active layer ACT1 are coupled to the source electrode SE1 and the drain electrode DE1, respectively. The source electrode SE1 of the first transistor M1 may protrude from a region of the first power line PL1 to be integrally configured (e.g., integral) with the first power line PL1 (e.g., the source electrode SE1 may be an integral position of the first power line PL1). The source electrode SE1 may be electrically coupled to one end of the active layer ACT1 through at least one contact hole CH. The drain electrode DE1 of the first transistor M1 may be electrically coupled to the other end of the active layer ACT1 through at least one contact hole CH. Also, the drain electrode DE1 may be electrically coupled to the pixel electrode PXE through a first via hole VH1.

The second gate electrode G12 of the first transistor M1 is disposed opposite to the first gate electrode G11 with the active layer ACT1 interposed therebetween. The second gate electrode G12 is disposed to be spaced apart from the active layer ACT1 by at least one insulating layer interposed therebetween. Also, the second gate electrode G12 is disposed to overlap with the active layer ACT1 in the channel region CHN1, and may be formed with a set (e.g., predetermined) margin MAR with respect to the channel region CHN1 to cover the channel region CHN1.

In some embodiments, the second gate electrode G12 may be disposed under the active layer ACT1. For example, the second gate electrode G12 may be disposed between the sensor substrate 141 and the active layer ACT1. The second gate electrode G12 of the first transistor M1 may be electrically coupled to the first gate electrode G11 of the first transistor M1 through at least one contact hole CH and a first connection pattern CNP1. If the second gate electrode G12 of the first transistor M1 is not floated but coupled to the first gate electrode G11, the operational characteristics of the first transistor M1 can be stabilized.

Also, the second gate electrode G12 of the first transistor M1 may be configured with a light shielding conductive layer such as a metal layer. Accordingly, although external light is introduced into the fingerprint sensor 140 from the display pixels 112, the second gate electrode G12 can prevent or reduce external light introduced into the channel region CHN1. Thus, a change in characteristic of the first transistor M1 due to external light, etc. or leakage current is prevented, and the operational characteristics of the first transistor M1 can be stabilized.

The second transistor M2 includes at least a first electrode G21, an active layer ACT2, a source electrode SE2, and a drain electrode DE2. Also, the second transistor M2 further includes a second gate electrode G22 overlapping with the first gate electrode G21 and a region of the active layer ACT2.

The first gate electrode G21 of the second transistor M2 is electrically coupled to the second gate electrode G22 through at least one contact hole CH, and the second gate electrode G22 of the second transistor M2 is electrically coupled to the pixel electrode PXE through at least one contact hole CH, a second connection pattern CNP2, and a second via hole VH2. The active layer ACT2 of the second transistor M2 is disposed such that a region of the active layer ACT2 overlaps with the first gate electrode G21. The active layer ACT2 is disposed to be spaced apart from the first gate electrode G21 with at least one insulating layer interposed therebetween. The active layer ACT2 includes a channel region CHN2 formed in the region overlapping with the first gate electrode G21, and the source electrode SE2 and the drain electrode DE2 are coupled to opposite ends of the active layer ACT2. For example, the active layer ACT2 may be electrically coupled to each of the source electrode SE2 and the drain electrode DE2 through at least one contact hole CH. The source electrode SE2 of the second transistor M2 is electrically coupled to a drain electrode DE3 of the third transistor M3. For example, the source electrode SE2 of the second transistor M2 may be integrally coupled to the drain electrode DE3 of the third transistor M3. The drain electrode DE2 of the second transistor M2 may protrude from a region of a corresponding readout line Rxj to integrally configured (e.g., integral) with the readout line Rxj (e.g., the drain electrode DE2 may be an integral portion of the readout line Rxj).

The second gate electrode G22 of the second transistor M2 is disposed opposite to the first gate electrode G21 with the active layer ACT2 interposed therebetween. The second gate electrode G22 is disposed to be spaced apart from the active layer ACT2 with at least one insulating layer interposed therebetween. Also, the second gate electrode G22 is disposed to overlap with the active layer ACT2 in the channel region CHN2, and may be formed with the set (e.g., predetermined) margin MAR with respect to the channel region CHN2 to cover the channel region CHN2. The second gate electrode G22 may be electrically coupled to the pixel electrode PXE through the second connection pattern CNP2 and the second via hole VH2.

In some embodiments, the second gate electrode G22 of the second transistor M2 may be disposed under the active layer ACT2. For example, the second gate electrode G22 may be disposed between the sensor substrate 141 and the active layer ACT2. The second gate electrode G22 of the second transistor M2 is coupled to the first gate electrode G21 through at least one contact hole CH. If the second gate electrode G22 of the second transistor M2 is not floated but coupled to the first gate electrode G21, the operational characteristics of the second transistor M2 can be stabilized.

Also, the second gate electrode G22 of the second transistor M2 may be configured with a light shielding conductive layer such as a metal layer. Accordingly, the second gate electrode G22 can prevent or reduce external light introduced into the channel region CHN2 from the display pixels 112, etc. Thus, a change in characteristic of the second transistor M2 due to external light, etc. or leakage current is prevented, and the operational characteristics of the second transistor M2 can be stabilized.

The third transistor M3 includes at least a first gate electrode G31, an active layer ACT3, a source electrode SE3, and the drain electrode DE3. Also, the third transistor M3 further includes a second gate electrode G32 overlapping with the first gate electrode G31 and a region of the active layer ACT3.

The first gate electrode G31 of the third transistor M3 may protrude from a region of a second scan line SLk to be integrally configured (e.g., integral) with the second scan line SLk (e.g., the first gate electrode G31 may be an integral portion of the second scan line SLk). The active layer ACT3 of the third transistor M3 is disposed such that a region of the active layer ACT3 overlaps with the first gate electrode G31. The active layer ACT3 is disposed to be spaced apart from the first gate electrode G31 with at least one insulating layer interposed therebetween. The active layer ACT3 includes a channel region CHN3 formed in the region overlapping with the first gate electrode G31, and the source electrode SE3 and the drain electrode DE3 are coupled to opposite ends of the active layer ACT. For example, the active layer ACT3 may be electrically coupled to each of the source electrode SE3 and the drain electrode DE3 through at least one contact hole CH. In some embodiments, the source electrode SE3 of the third transistor M3 may protrude from a region of the first power line PL1 to be integrally configured (e.g., integral) with the first power line PL1 (e.g., the source electrode SE3 may be an integral portion of the first power line PL1). The drain electrode DE3 of the third transistor M3 may be coupled to the source electrode SE2 of the second transistor M2.

The second gate electrode G32 of the third transistor M3 is disposed opposite to the first gate electrode G31 with the active layer ACT3 interposed therebetween. The second gate electrode G32 is disposed to be spaced apart from the active layer ACT3 with at least one insulating layer interposed therebetween. Also, the second gate electrode G32 is disposed to overlap with the active layer ACT3 in the channel region CHN3, and may be formed with the set (e.g., predetermined) margin MAR with respect to the channel region CHN3 to cover the channel region CHN3.

In some embodiments, the second gate electrode G32 of the third transistor M3 may be disposed under the active layer ACT3. For example, the second gate electrode G32 may be disposed between the sensor substrate 141 and the active layer ACT3. The second gate electrode G32 of the third transistor M3 may be electrically coupled to each of the first gate electrode G31 and a first electrode CE1 of the first capacitor C1 through at least one contact hole CH. If the second gate electrode G32 of the third transistor M3 is not floated but coupled to the first gate electrode G31, the operational characteristics of the third transistor M3 can be stabilized.

Also, the second gate electrode G32 of the third transistor M3 may be configured with a light shielding conductive layer such as a metal layer. Accordingly, the second gate electrode G32 can prevent or reduce external light introduced into the channel region CHN3 from the display pixels 112, etc. Thus, a change in characteristic of the third transistor M3 due to external light, etc. or leakage current is prevented, and the operational characteristics of the third transistor M3 can be stabilized.

The first capacitor C1 includes the first electrode CE1 and a second electrode CE2, which overlap with each other. The first electrode CE1 of the first capacitor C1 is electrically coupled to the second scan line SLk. For example, the first electrode CE1 may be electrically coupled to the first and second gate electrodes G31 and G32 of the third transistor M3 and the second scan line SLk via at least one contact hole CH.

The second electrode CE2 of the first capacitor C1 is disposed to be spaced apart from the first electrode CE1 with at least one insulating layer interposed therebetween. In some embodiments, the second electrode CE2 may be integrally configured (e.g., integral) with the pixel electrode PXE (e.g., the second electrode CE2 may be an integral part of the pixel electrode PXE).

The pixel electrode PXE is disposed in the area of each sensor pixel 142, to form a contact capacitance Cf by being in contact with (e.g., in proximity to) a contact means. The pixel electrode PXE is formed with a size (e.g., an area) large enough to provide a sufficient sensitivity such that a fingerprint and/or a touch input is detected. For example, the pixel electrode PXE may be formed to have the widest area among the components of the sensor pixel 142.

According to the embodiments described above, the light shielding second gate electrodes G12, G22, and G32 overlapping with the channel regions CHN1, CHN2, and CHN3 are formed on the bottom of the active layers ACT1, ACT2, and ACT3 of the first to third transistors M1, M2, and M3 provided in the sensor pixel 142, respectively. Accordingly, the operational characteristics of the first to third transistors M1, M2, and M3 can be stabilized, and the reliability of the fingerprint sensor 140 can be improved.

In an embodiment of the present disclosure, the first to third transistors M1, M2, and M3 may be configured as various types of transistors such as an oxide transistor. For example, the active layers ACT1, ACT2, and ACT3 of the first to third transistor M1, M2, and M3 may be made of an oxide of a metal such as In, Ga, Zn, Sn, or Ti, or a combination of a metal such as In, Ga, Zn, Sn, or Ti and an oxide thereof. More specifically, examples of an oxide semiconductor constituting the active layers ACT1, ACT2, and ACT3 may be ZnO, ZTO, ZIO, IZO, InO, TiO, IGZO, IZTO, and the like, and the oxide semiconductor may be partially crystallized. In addition to the oxide semiconductor, any material may be used as the material constituting the active layers ACT1, ACT2, and ACT3 as long as it constitutes a channel. For example, the active layers ACT1, ACT2, and AC3 may be made of an amorphous or polycrystalline silicon, etc. According to an embodiment of the present disclosure, although the active layers ACT1, ACT2, and ACT3 of the first to third transistors M1, M2, and M3 are made of, for example, an oxide semiconductor, the operational characteristics of the first to third transistors M1, M2, and M3 can be stabilized.

The second gate electrodes G12, G22, and G32 of the first to third transistors M1, M2, and M3 may be formed with the set (e.g., predetermined) margin MAR to cover the channel regions CHN1, CHN2, and CHN3 of the active layers ACT1, ACT2, and ACT3, respectively, in order to improve the reliability of the first to third transistors M1, M2, and M3. For example, each of the second gate electrodes G12, G22, and G32 may be designed to have an area sufficient to stably block external light introduced into each of the active layer ACT1, ACT2, and ACT3. In this case, a relatively large parasitic capacitance (Cp of FIG. 5) may be formed between the pixel electrode PXE and each of the second gate electrodes G12, G22, and G32. For example, as the margin MAR of the second gate electrode G12 of the first transistor M1 becomes larger, a larger parasitic capacitance Cp1 may be formed between the second gate electrode G12 and the pixel electrode PXE.

Additionally, in another embodiment of the present disclosure, as the area of the first electrode CE1 of the first capacitor C1 is expanded, the capacitance of the first capacitor C1 may be increased, so that the influence caused by the parasitic capacitance Cp can be reduced. However, the first electrode CE1 (e.g., the area of the first electrode CE1) may have influence on the transmittance of the fingerprint sensor 140, and therefore, there may be a limitation in increasing the capacitance of the first capacitor C1 in terms of the image quality of the display device 100.

Accordingly, in the following embodiment, a sensor pixel will be proposed, which can ensure the reliability of the first to third transistors M1, M2, and M3 through the second gate electrodes G12, G22, G32 of the first to third transistors M1, M2, and M3, and decrease the magnitude of the parasitic capacitance Cp that has influence on the voltage of the first node N1, thereby improving the sensitivity of the fingerprint sensor 140.

Figure 7:
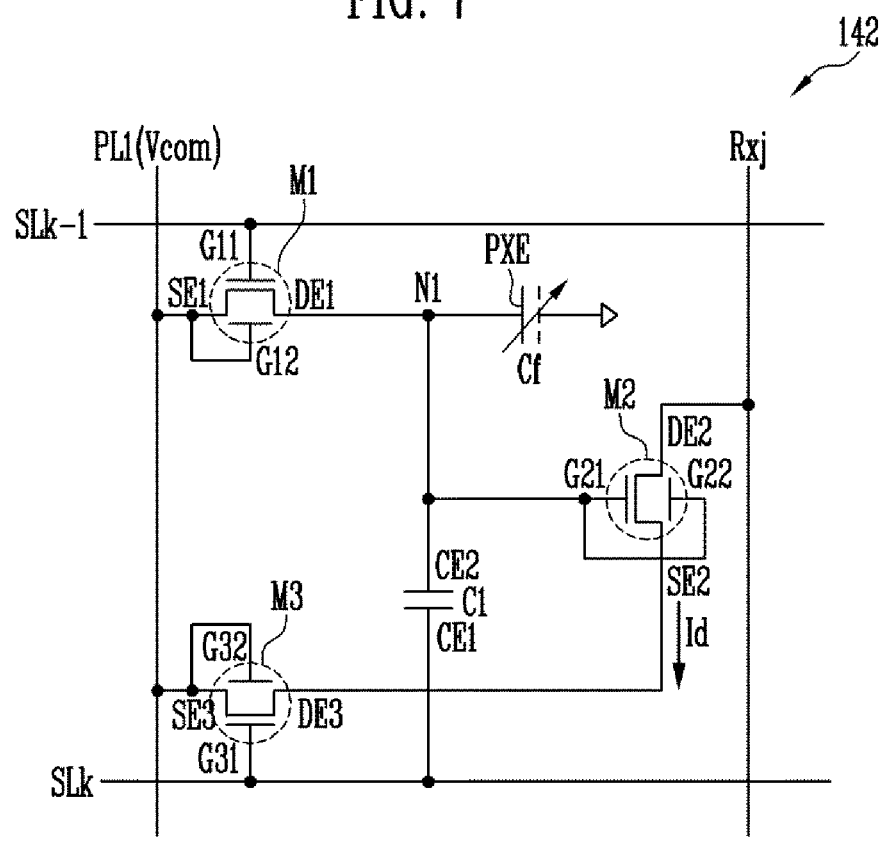
FIG. 7 illustrates a sensor pixel according to another embodiment of the present disclosure.
Figure 8:
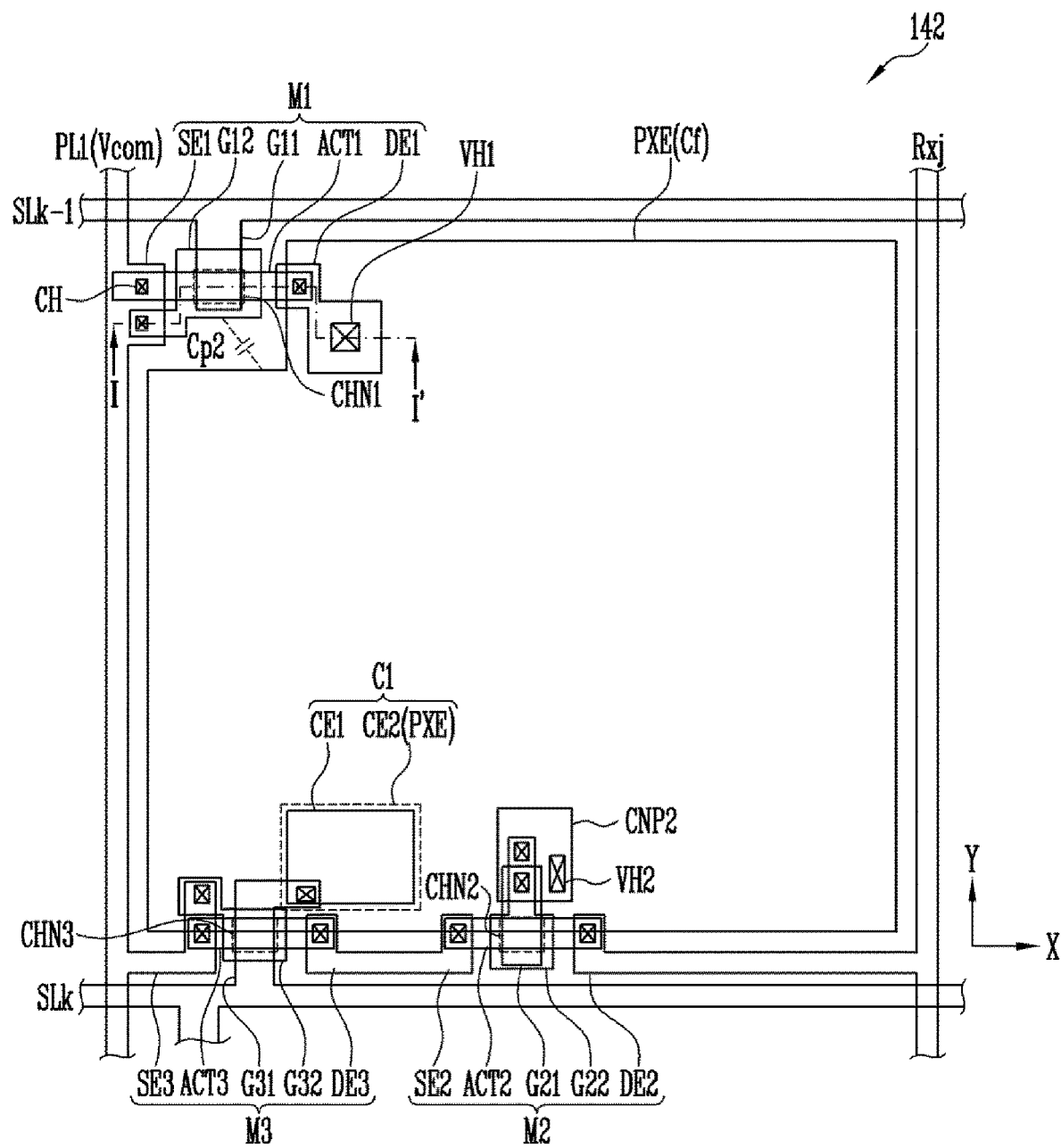
FIGS. 8 and 9 illustrate layout embodiments of the sensor pixel shown in FIG. 7.
Figure 9:
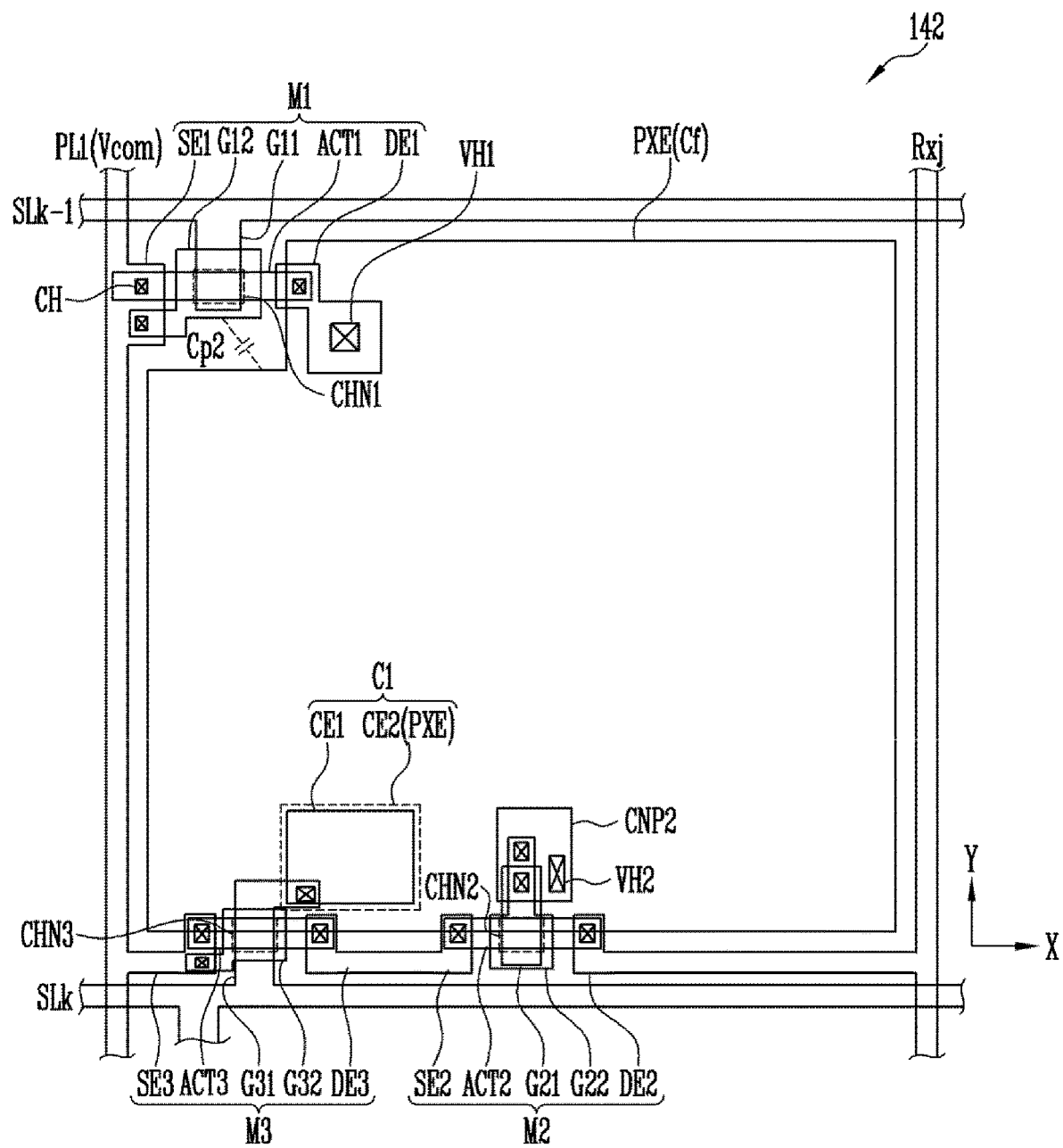

FIG. 7 illustrates a sensor pixel according to another embodiment of the present disclosure. FIGS. 8 and 9 illustrate different layout embodiments of the sensor pixel shown in FIG. 7. In some embodiments, the structure of the sensor pixel shown in FIGS. 7 to 9 may be applied to at least one of the plurality of sensor pixels constituting the fingerprint sensor. For example, each of the sensor pixels may have substantially the same structure. In the embodiment shown in FIGS. 7 to 9, detailed descriptions of components similar or identical to those of the embodiment shown in FIGS. 5 and 6 will be omitted.

First, referring to FIG. 7, the second gate electrode G12 of the first transistor M1 is coupled to the source electrode SE1 of the first transistor M1. For example, the second gate electrode G12 of the first transistor M1 may be coupled together with the source electrode SE1 to the first power line PL1.

In addition, the second gate electrode G32 of the third transistor M3 is electrically coupled to the source electrode SE3 of the third transistor M3. For example, the second gate electrode G32 of the third transistor M3 may be coupled together with the source electrode SE3 to the first power line PL1.

For example, the first connection pattern CNP1 shown in FIG. 6 may be removed. In addition, as shown in FIGS. 8 and 9, the second gate electrode G12 may extend in the direction of the source electrode SE1 such that a region of the second gate electrode G12 overlaps with the source electrode SE1, and the second gate electrode G12 and the source electrode SE1 may be electrically coupled to each other through at least one contact hole CH. Accordingly, it is possible to decrease the magnitude of a parasitic capacitance Cp2 formed between the second gate electrode G12 of the first transistor M1 and the pixel electrode PXE.

Also, as shown in FIGS. 8 and 9, the second gate electrode G32 of the third transistor M3 may extend in the direction in which the second gate electrode G32 overlaps with the source electrode SE3 of the third transistor M3, and the second gate electrode G32 may be electrically coupled to the source electrode SE3 through at least one contact hole CH. Accordingly, it may be possible to further decrease the magnitude of the entire parasitic capacitance Cp that has influence on the voltage of the first node N1.

As described above, in this embodiment, the second gate electrodes G12 and G32 of the first and third transistors M1 and M3 that serve as switching elements in each sensor pixel 142 are coupled to the source electrodes SE1 and SE3 of the first and third transistors M1 and M3, respectively. Accordingly, the operational characteristics of the first and third transistors M1 and M3 can be stabilized, and it is possible to decrease the magnitude of the parasitic capacitance Cp that has influence on the voltage of the first node N1. Thus, the sensitivity of the fingerprint sensor 140 can be improved.

Meanwhile, like the embodiment shown in FIGS. 5 and 6, in the second transistor M2 that serves as a driving element of each sensor pixel 142, the second gate electrode G22 is coupled to the first gate electrode G21. Accordingly, the second transistor M2 may have improved (e.g., ensured) response speed and current driving characteristics.

Figure 10:
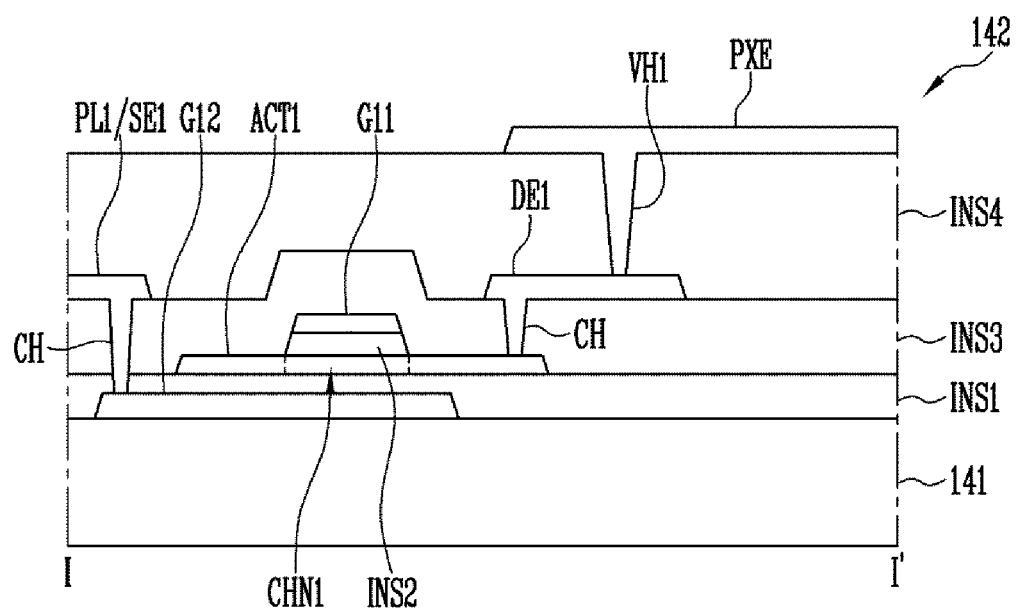
FIG. 10 illustrates an example of a section taken along line I-I' of FIG. 8.

FIG. 10 illustrates an example of a section taken along line I-I' of FIG. 8. For convenience, in FIG. 10, an arrangement structure (e.g., a stacking order) of layers in each electrode provided in the sensor pixel will be briefly described through the sectional structure of the first transistor.

Referring to FIG. 10, the second gate electrode G12 is disposed on the sensor substrate 141, and a first insulating layer INS1 is disposed on the second gate electrode G12. The active layer ACT1 including the channel region CHN1 is disposed on the first insulating layer INS1. A second insulating layer INS2 is disposed on the active layer ACT1. In some embodiments, the second insulating layer INS2 may be locally disposed on the channel region CHN1. In some other embodiments, the second insulating layer INS2 may be disposed in the entire sensing area SA. The first gate electrode G11 is disposed on the second insulating layer INS2. The first gate electrode G11 overlaps with (or defines) the channel region CHN1. A third insulating layer INS3 is disposed on the sensor substrate 141 on which the first gate electrode G11 is formed. The source electrode SE1 and the drain electrode DE1 are disposed on the third insulating layer INS3. A fourth insulating layer INS4 is disposed over the source electrode SE1 and the drain electrode DE1. The pixel electrode PXE is disposed on the fourth insulating layer INS4.

Meanwhile, although not shown in FIG. 10, the second and third transistors M2 and M3 may also have sectional structures substantially identical or similar to that of the first transistor M1. For example, the second gate electrodes G12, G22, and G32 of the first to third transistors M1, M2, and M3 may be disposed on the same layer, and the active layers ACT1, ACT2, and ACT3 of the first to third transistors M1, M2, and M3 may be disposed on the same layer. In addition, the first gate electrodes G11, G21, and G31 of the first to third transistors M1, M2, and M3 may be disposed on the same layer, and the source electrodes SE1, SE2, and SE3 and the drain electrodes DE1, DE2, and DE3 of the first to third transistors M1, M2, and M3 may be disposed on the same layer.

Additionally, although not shown in FIG. 10, the first electrode CE1 of the first capacitor C1 may be disposed on the same layer as one electrodes of the first to third transistors M1, M2, and M3. For example, the first electrode CE1 of the first capacitor C1 may be disposed on the same layer as the source electrodes SE1, SE2, and SE3 and/or the drain electrodes DE1, DE2, and DE3 of the first to third transistors M1, M2, and M3. Meanwhile, in some embodiments, the second electrode CE2 of the first capacitor C1 may be integrally configured (e.g., integral) with the pixel electrode PXE as described above.

Like the above-described embodiment, the second gate electrodes G12, G22, and G23 of the first to third transistors M1, M2, and M3 may be at the lowermost portion among the conductive components constituting the first to third transistors M1, M2, and M3. For example, the second gate electrodes G12, G22, and G32 of the first to third transistors M1, M2, and M3 may be disposed between the sensor substrate 141 and the active layers ACT1, ACT2, and ACT3 to overlap with the channel regions CHN1, CHN2, and CHN3, respectively. In addition, as described above, the second gate electrodes G12, G22, and G32 of the first to third transistors M1, M2, and M3 may be configured with a light shielding conductive layer. Thus, although light is incident into the fingerprint sensor 140 from the display panel 110 disposed on the bottom of the sensor substrate 141 by emission of the display pixels 112, it is possible to prevent or reduce the incident light introduced into the channel regions CHN1, CHN2, and CHN3 of the first to third transistors M1, M2, and M3.

Figure 11:
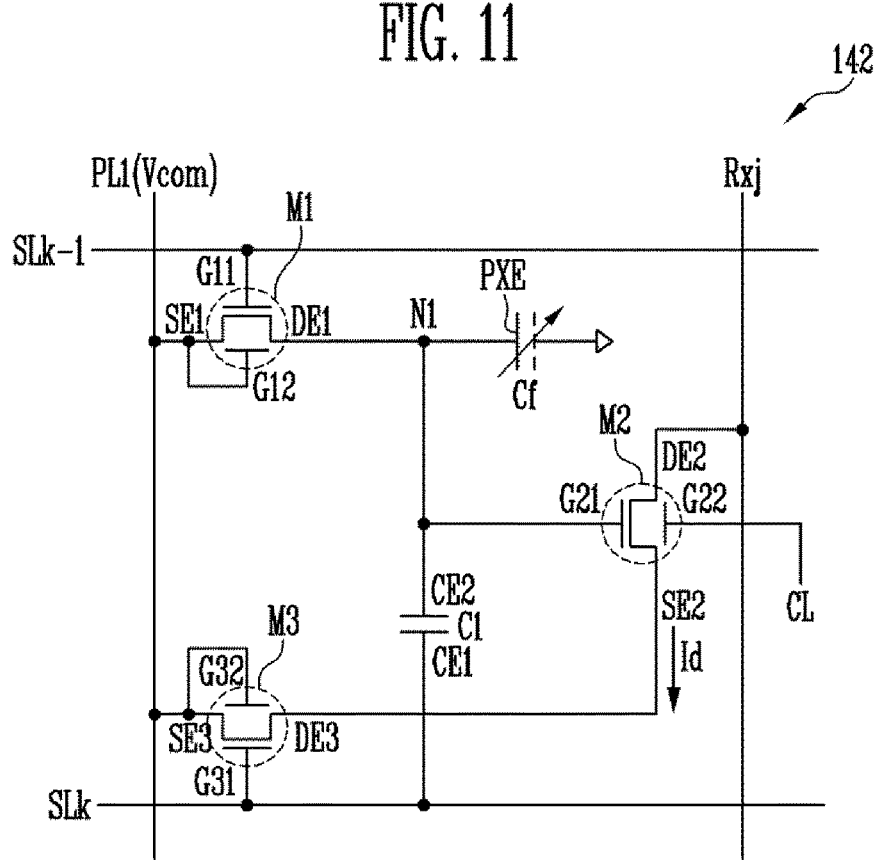
FIG. 11 illustrates a sensor pixel according to still another embodiment of the present disclosure.

FIG. 11 illustrates a sensor pixel according to still another embodiment of the present disclosure. In the embodiment shown in FIG. 11, detailed descriptions of components similar or identical to those of the embodiment shown in FIG. 7 will be omitted.

Referring to FIG. 11, the second gate electrode G22 of the second transistor M2 may be coupled to a set (e.g., predetermined) control line CL. For example, the second gate electrode G22 of the second transistor M2 may not be coupled to the first gate electrode G21. In some embodiments, a voltage capable of controlling the threshold voltage of the second transistor M2, e.g., a set and/or predetermined back bias voltage may be applied to the control line CL. To this end, the control line CL may be coupled to a set (e.g., predetermined) DC voltage source for applying the back bias voltage.

According to the above-described embodiment, characteristics of the second transistors M2 provided in the fingerprint sensor 140 can be equalized, and operational characteristics of the second transistors can be controlled. That is, in the above-described embodiment, a sufficient driving current Id can be encouraged or ensured according to the double gate effect of the second transistors M2, and it may be possible to compensate for a difference in current characteristic between the fingerprint sensors 140 and/or the sensor pixels 142 due to a process deviation, etc. For example, after a current flowing in each fingerprint sensor 140 that is completely fabricated is measured, a back bias voltage may be set for each fingerprint sensor 140 and/or each sensor pixel 142 such that the fingerprint sensors 140 and/or the sensor pixels 142 exhibit a uniform current characteristic. Further, according to the above-described embodiment, it is possible to compensate for a characteristic change due to degradation of the second transistor M2 by controlling the back bias voltage.

Figure 12:
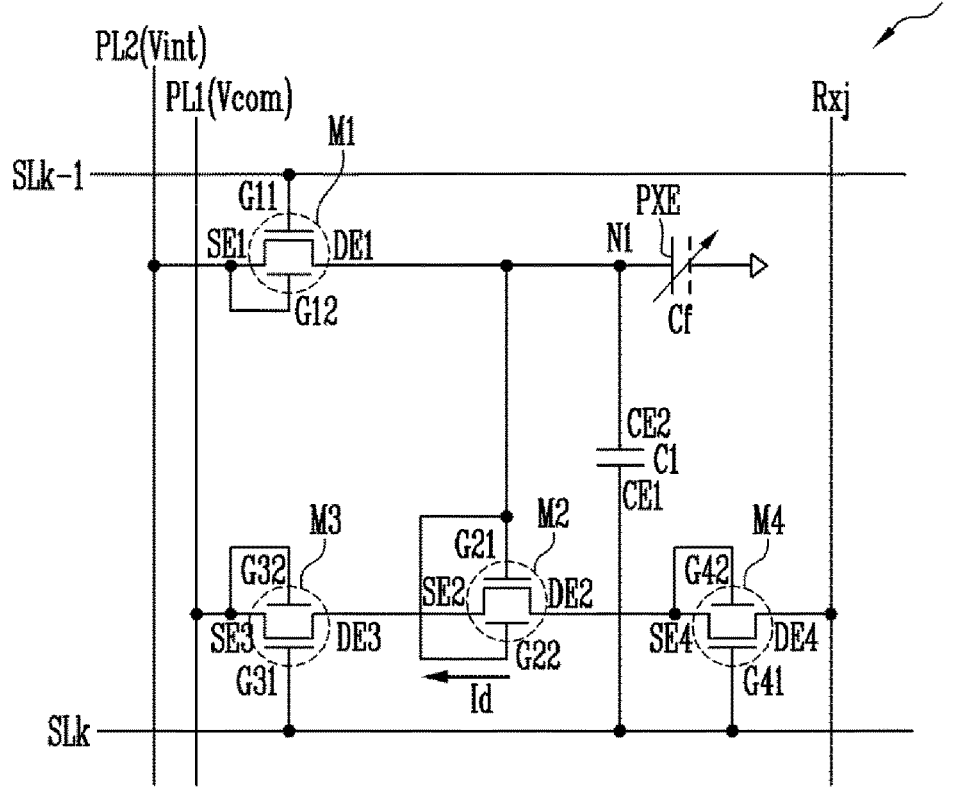
FIG. 12 illustrates a sensor pixel according to still another embodiment of the present disclosure.

FIG. 12 illustrates a sensor pixel according to still another embodiment of the present disclosure. In the embodiment shown in FIG. 12, detailed descriptions of components similar or identical to those of the above-described embodiments will be omitted.

Referring to FIG. 12, the fingerprint sensor 140 according to an embodiment of the present disclosure may further include at least one second power line PL2 disposed in the second area SA. In some embodiments, the second power line PL2 may extend along the second direction in the sensing area SA. For example, the second power line PL2 may extend in parallel to the first power line PL1 along the Y direction while being spaced apart from the first power line PL1 at a set (e.g., predetermined) distance. A set (e.g., predetermined) initialization voltage Vint may be applied to the second power line PL2.

In some embodiments, each sensor pixel 142 may be disposed in an area defined by the first and second scan lines SLk−1 and SLk, the first power line PL1 and/or the second power line PL2, and the readout line Rxj. For example, each pixel electrode PXE may be disposed in each unit area surrounded by the first and second scan lines SLk−1 and SLk, the first power line PL1 and/or the second power line PL2, and the readout line Rxj.

Also, in some embodiments, the first transistor M1 may be coupled between the first node N1 and the second power line PL2. For example, the source electrode SE1 and the second gate electrode G12 of the first transistor M1 may be coupled to the second power line PL2. The first transistor M1 is turned on when the scan signal of the gate-on voltage is supplied to the first scan line SLk−1. Accordingly, the first node N1 is electrically coupled to the second power line PL2, so that the voltage of the first node N1 is initialized (or reset) as the initialization voltage Vint is transferred to the first node N1.

Meanwhile, in some embodiments, each sensor pixel 142 may further include a fourth transistor M4 coupled between each readout line Rxj and the second transistor M2. For example, the fourth transistor M4 may include a drain electrode DE4 coupled to the corresponding readout line Rxj and a source electrode SE4 coupled to the drain electrode DE2 of the second transistor M2. Also, the fourth transistor M4 may be provided in a double gate structure. For example, the fourth transistor M4 may include a first gate electrode G41 coupled to the second scan line SLk and a second gate electrode G42 coupled to the source electrode SE4.

The second gate electrode G42 of the fourth transistor M4 may be disposed opposite to the first gate electrode G41 with a channel region formed in an active layer of the fourth transistor M4, which is interposed therebetween. Also, the second gate electrode G42 of the fourth transistor M4 is disposed on the same layer as the first to third transistors M1, M2, and M3, and may be configured as a light shielding conductive layer.

The fourth transistor M4 is turned on when the scan signal of the gate-on voltage is supplied to the second scan line SLk, to allow the readout line Rxj and the second transistor M2 to be electrically coupled to each other. That is, the fourth transistor M4 is additionally disposed on the current path of the driving current Id, and noise or leakage current can be controlled by the fourth transistor M4. Like the above-described embodiment, the structure of the sensor pixel 142 and/or the driving method thereof may be variously modified.

According to the above-described embodiments of the present disclosure, the transistors M1, M2, M3, and M4 provided in the sensor pixel 142 are provided in a double gate structure, and the second gate electrodes G12, G22, G23, and G24 of the transistors M1, M2, M3, and M4 may be configured with a light shielding conductive layer. Accordingly, the reliability of the transistors M1, M2, M3, and M4 can be improved or ensured.

Further, according to the embodiments of the present disclosure, the second gate electrodes G12, G32, and/or G42 of the first, third, and/or fourth transistors M1, M3, and M4 that serve as switching elements in each sensor pixel 142 are coupled to the source electrodes SE1, SE3, and/or SE4 of the first, third, and/or fourth transistors M1, M3, and M4, respectively. Accordingly, the sensitivity of the fingerprint sensor 140 can be improved by decreasing the magnitude of the parasitic capacitance Cp that has influence on the voltage of the first node N1.

Additionally, according to the embodiments of the present disclosure, in the second transistor M2 that serves as a driving element in each sensor pixel 142, the second gate electrode G22 is coupled to the first gate electrode G21 and/or the set (e.g., predetermined) control line CL1 (not shown). Accordingly, the operational characteristics of the second transistor M2 can be improved.

According to the present disclosure, it is possible to provide a fingerprint sensor having high sensitivity and reliability and a display device including the fingerprint sensor.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A fingerprint sensor comprising:
   at least one sensor pixel arranged in a sensing area, wherein the sensor pixel includes:
   a pixel electrode coupled to a first node;
   a first transistor including a source electrode and a drain electrode, the first transistor being coupled between the first node and a second power line, the first transistor including a first gate electrode coupled to a first scan line and a second gate electrode opposite to the first gate electrode, the second gate electrode being coupled to the second power line;
   a first capacitor coupled between the first node and a second scan line, and comprising a first electrode, and a second electrode comprising a portion of the pixel electrode that overlaps with, and entirely surrounds a periphery of, the first electrode of the first capacitor in a plan view;
   a second transistor coupled between a readout line and a first power line, the second transistor including a first gate electrode coupled to the first node and a second gate electrode opposite to the first gate electrode; and
   a third transistor coupled between the second transistor and the first power line to connect the second transistor to the first power line, the third transistor including a first gate electrode coupled to the second scan line and a second gate electrode opposite to the first gate electrode and coupled to the first power line,
   wherein the first electrode of the first capacitor is electrically connected to the first gate electrode of the third transistor and the second scan line via at least one contact hole,
   wherein the second electrode of the first capacitor overlaps the first electrode of the first capacitor in the plan view,
   wherein an area of the pixel electrode is greater than an area of the first electrode of the first capacitor in the plan view,
   wherein the source electrode of the first transistor is directly connected to the second gate electrode of the first transistor and the second power line, and
   wherein the drain electrode of the first transistor is electrically connected to the pixel electrode and the second electrode of the first capacitor.

2. The fingerprint sensor of claim 1, wherein the second gate electrode of the second transistor is coupled to the first gate electrode of the second transistor.

3. The fingerprint sensor of claim 1, wherein the second gate electrode of the second transistor is coupled to a control line.

4. The fingerprint sensor of claim 1, wherein the first gate electrodes of the first, second, and third transistors are disposed on active layers of the first, second, and third transistors, respectively, to be spaced apart from the active layers, and
   the second gate electrodes of the first, second, and third transistors are disposed between a sensor substrate and the active layers of the first, second, and third transistors, respectively, to be spaced apart from the active layers.

5. The fingerprint sensor of claim 4, wherein each of the second gate electrodes of the first, second, and third transistors is configured with a light shielding conductive layer.

6. The fingerprint sensor of claim 1, wherein the second gate electrode of the third transistor is coupled to a source electrode of the third transistor, and
   the second gate electrode of the second transistor is coupled to the first gate electrode of the second transistor.

7. The fingerprint sensor of claim 1, further comprising a fourth transistor coupled between the readout line and the second transistor, the fourth transistor including a first gate electrode coupled to the second scan line and a second gate electrode opposite to the first gate electrode.

8. The fingerprint sensor of claim 7, wherein the second gate electrode of the fourth transistor is coupled to a source electrode of the fourth transistor.

9. The fingerprint sensor of claim 1, wherein the first and second scan lines extend along a first direction while being spaced apart from each other in the sensing area,
the first power line, the second power line and the readout line extend along a second direction while being spaced apart from each other in the sensing area, and
the pixel electrode is disposed in a unit area surrounded by the first and second scan lines, the first power line, the second power line, and the readout line.

10. The fingerprint sensor of claim 1, comprising:
a plurality of scan lines including the first and second scan lines;
a plurality of readout lines including the readout line;
a plurality of power lines including the first power line and the second power line; and
a plurality of sensor pixels including the at least one sensor pixel, the plurality of sensor pixels being coupled to the scan lines, the readout lines and the plurality of power lines.

11. The fingerprint sensor of claim 1, wherein the first transistor is configured to connect the second power line to the first node to set a voltage of the first node to an initialization voltage,
wherein the second scan line is configured to supply a gate-on voltage to the third transistor and to the first capacitor to turn the third transistor on to connect the second transistor to the first power line, and
wherein the first capacitor is configured to change the voltage of the first node from the initialization voltage according to the gate-on voltage supplied from the second scan line.

12. The fingerprint sensor of claim 1, wherein the first gate electrode of the second transistor overlaps with another portion of the pixel electrode, and is connected to the another portion via a contact hole.

13. A display device comprising:
a display panel including display pixels arranged in a display area; and
a fingerprint sensor including scan lines, readout lines, a plurality of power lines, and sensor pixels, which are arranged in a sensing area,
wherein at least one of the sensor pixels includes:
a pixel electrode coupled to a first node;
a first transistor including a source electrode and a drain electrode, the first transistor being coupled between the first node and a second power line, the first transistor including a first gate electrode coupled to a first scan line and a second gate electrode opposite to the first gate electrode, the second gate electrode being coupled to the second power line;
a first capacitor coupled between the first node and a second scan line, and comprising a first electrode, and a second electrode comprising a portion of the pixel electrode that overlaps with, and entirely surrounds a periphery of, the first electrode of the first capacitor in a plan view;
a second transistor coupled between a first power line and any one readout line among the readout lines, the second transistor including a first gate electrode coupled to the first node and a second gate electrode opposite to the first gate electrode; and
a third transistor coupled between the second transistor and the first power line to connect the second transistor to the first power line, the third transistor including a first gate electrode coupled to the second scan line and a second gate electrode opposite to the first gate electrode and coupled to the first power line,
wherein the first electrode of the first capacitor is electrically connected to the first gate electrode of the third transistor and the second scan line via at least one contact hole,
wherein the second electrode of the first capacitor overlaps the first electrode of the first capacitor in the plan view,
wherein an area of the pixel electrode is greater than an area of the first electrode of the first capacitor in the plan view,
wherein the source electrode of the first transistor is directly connected to the second gate electrode of the first transistor and the second power line, and
wherein the drain electrode of the first transistor is electrically connected to the pixel electrode and the second electrode of the first capacitor.

14. The display device of claim 13, wherein the second gate electrode of the second transistor is coupled to the first gate electrode of the second transistor.

15. The display device of claim 13, wherein the second gate electrode of the second transistor is coupled to a control line.

16. The display device of claim 13, wherein each of the first, second, and third transistors includes:
an active layer disposed on a sensor substrate, the active layer including a channel region;
the first gate electrode disposed on the active layer to overlap with the channel region; and
the second gate electrode disposed between the sensor substrate and the active layer to overlap with the channel region,
wherein a source electrode and a drain electrode of each of the second and third transistors, and the source electrode and the drain electrode of the first transistor, are respectively coupled to different ends of the corresponding active layer.

17. The display device of claim 16, wherein each of the second gate electrodes of the first, second, and third transistors is configured with a light shielding conductive layer.

18. The display device of claim 16, wherein the second gate electrode of the third transistor is coupled to a source electrode of the third transistor.

19. The display device of claim 13, wherein at least one of the sensor pixels further includes a fourth transistor coupled between the one readout line and the second transistor,
wherein the fourth transistor includes:
a first gate electrode coupled to the second scan line;
a drain electrode coupled to the one readout line; and
a source electrode and a second gate electrode, coupled to the second transistor.

20. The display device of claim 13, wherein the sensing area is disposed to overlap with the display area.

* * * * *